United States Patent Office 3,457,099
Patented July 22, 1969

3,457,099
PROCESS FOR BONDING A POLYSULFIDE POLYMER BASED SEALANT TO A SUBSTRATE
Charles J. De Angelo, Jr., and Raymond J. Thibodeau, Trenton, N.J., assignors to Thiokol Chemical Corporation, Bristol, Pa., a corporation of Delaware
No Drawing. Filed May 26, 1965, Ser. No. 459,119
Int. Cl. B44d *1/36, 1/14*
U.S. Cl. 117—75                                    13 Claims

ABSTRACT OF THE DISCLOSURE

A curable, liquid polysulfide polymer based sealant composition is bonded to a substrate by priming the substrate with a primer containing at least one organic silane compound and at least one Friedel-Crafts compound, applying the curable composition to the primed substrate and curing the composition on the substrate.

---

The present invention relates to a primer composition to be used in conjunction with a liquid polysulfide polymer based sealant composition and to processes for bonding liquid polysulfide polymer based sealant compositions to structural element substrates.

Curable, liquid polysulfide polymer based sealant and caulking compositions have long been known in the art. They are based on curable, liquid, polysulfide polymers. The structure and preparation of polythiopolymercaptan polymers of this type are disclosed in U.S. 2,466,963. The polymer compositions are used in sealing and/or caulking operations to bond together, and/or fill seams between, various types of structural elements in various industries. The adhesive qualities of polysulfide polymers are such, however, as to require, in some cases, the use of an adhesive additive therewith, either in the polysulfide polymer based sealant composition itself or applied to the substrate to which the sealant is to be applied as a primer prior to the application of the sealant in order to insure a good bonding of the cured sealant to the substrate.

The use of organic silane primers with polythiopolymercaptan based sealant used on glass substrates is disclosed in U.S. 3,123,495.

One problem which up to the time of the present invention has been very troublesome is that of getting good adhesion of the sealant composition to the substrate within a relatively short time after the time of applying the sealant composition. Until the sealant composition cures, the adhesion of the sealant to the substrate is generally such as to allow under adverse stress conditions, the sealant composition to break away from the substrate, thus causing voids and thus causing a poor final bond of the cured sealant to the substrate. This problem can be solved by first priming the substrate with a silane primer of the type described below in order to improve the adhesion of the sealant to the substrate as disclosed in U.S. 3,123,495. However, in order to get adhesion within a relative short time, such as a few minutes from the time of applying the sealant composition to the substrate, it is first necessary to wait for a relatively long period of time, such as an hour or longer, between the time of application of the primer to the substrate and the time of application of the sealant composition to the primed substrate in order to provide sufficient time for the primer to function properly. Such long delays may be costly, as well as inconvenient. It has now been unexpectedly found that by adding, as an adhesion accelerator, a Friedel-Crafts compound to the silane primer, that within a relatively short period of time after applying the silane primer to the substrate, that the sealant composition can be applied to the primed substrate as to obtain instant adhesion within a relatively short time between the sealant composition and the primed substrate.

One of the objects of the present invention is to provide instant adhesion, or adhesion in a relatively short time, after the application of a polysulfide polymer based sealant to a substrate.

Another object of the present invention is to provide a novel primer composition which will allow for the attainment of a strong and lasting bonding of a polysulfide polymer based sealant to a substrate wherein said primer composition requires a relatively short drying time before application of the sealant to the primed substrate.

A still further object of this invention is to permit a polysulfide polymer based sealant to be bonded easily and quickly to metals, glass, ceramics, concrete, etc., so as to obtain a strong and lasting bond which bond has excellent heat, chemical, oil and solvent resistance and generally good durability and long life.

Another object of the present invention is to provide one or more processes by means of which liquid polysulfide polymer based sealant and caulking compositions may be used so as to attain a strong and lasting bonding of the cured composition to the substrate(s) being treated therewith, particularly where the bonded sealant is to be used in the presence of polar solvents.

Other objects of this invention will be apparent from the remainder of the disclosure.

A Friedel-Crafts compound is a term recognized in the art to include a broad class of inorganic halides which have been found useful in catalyzing Friedel-Crafts type reactions. (See Fieser and Fieser, Organic Chemistry, 3rd edition, 1965, pp. 535–540.) The preferred Friedel-Crafts type compounds which may be used as adhesion accelerators according to the present invention are the Group IIIA and Group VIII [1] metal halides such as $BF_3$, $AlCl_3$, and $FeCl_3$. These materials may be used as is, or in the form of complexes with ethers and similar materials such as a $BF_3$ etherate.

The silane compounds which may be used in the primer compositions of the present invention may be classed generally as organic-silanes. Organic-silanes having one or more alkoxy groups containing from 1–4 carbon atoms, preferably a methoxy or ethoxy group, or one or more aryloxy groups such as phenoxy or benzoxy groups or one or more acyloxy groups containing from 1–4 carbon atoms such as acetoxy, formoxy, etc. groups as well as compounds containing one or more vinyl, $NH_2$, or mercapto groups are found to be especially useful as primers in the present invention. Examples of such organic-silane compounds are organoalkoxysilanes such as methyltrimethoxysilane, vinyltrimethoxy silane, organochlorosilanes such as methyltrichlorosilane, gamma amino propyl triethoxysilane, vinyltriacetoxysilane, mercapto alkyl polyalkoxy silanes such as mercapto propyl trimethoxysilane and mercapto propyl triethoxysilane, disclosed in copending application S.N. 311,661 filed September 26, 1963, in the name of J. J. Giordano, now U.S. 3,312,669, β-mercapto alkyl amino alkyl trialkoxy silanes such as β-mercapto ethylamine propyl triethoxy silane of the structure $(CH_3CH_2O)$– Si–$(CH_2)_3$NH—$CH_2CH_2SH$ disclosed in copending application S.N. 335,391 filed January 2, 1964, in the name of G. F. Bulbenko, now U.S. 3,297,473; β-mercapto alkyl amino alkyl trialkoxy silane compounds such as β-mercapto ethyl amino propyl triethoxy silane of the structure

and β-mercapto ethyl amino propyl triethoxy silane compounds of the structure

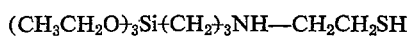

---

[1] Mendeleef Periodic Table printed in Lange's Handbook of Chemistry, ninth edition, McGraw-Hill, 1956, pp. 56–57.

as disclosed in copending application S.N. 335,426 filed January 2, 1964 in the name of G. F. Bulbenko, now U.S. 3,328,451; and the silane coupling agents disclosed by E. P. Plueddemann et al. in Modern Plastics 39, 135 (August 1962). The mercapto alkyl polyalkoxy silanes as exemplified by mercapto propyl trimethoxysilane and mercapto propyl triethoxysilane are especially preferred.

The polysulfide polymers upon which the sealant or caulking compositions of the present invention are based are organic polymeric materials which are liquid at room temperature and which contain recurring polysulfide linkages, i.e., $-(S_n)-$, in the polymeric backbone wherein $n$ is, on the average, about 1.5 to 5. For chain extension and curing purposes these polymers should contain reactive groups such as —SH, —OH, —$NH_2$, —NCO. These polymers include for example, those liquid polythiopolymercaptan polymers as are disclosed, as noted above, in U.S. 2,466,963; isocyanate terminated polymers such as those disclosed in copending application S.N. 310,925 filed September 23, 1963, now abandoned in the name of E. F. Kutch, now pending application S.N. 632,541 filed April 21, 1967, a continuation in part; "high-rank" (—SSH) terminated polymers such as those disclosed in copending application S.N. 290,637 filed June 26, 1963, in the name of E. R. Bertozzi, now U.S. 3,331,818; blocked "high-rank" (—SSH) terminated polymers such as those disclosed in copending application S.N. 302,724 filed August 16, 1963, in the name of E. R. Bertozzi, now copending application S.N. 661,128, a continuation; and amine (—$NH_2$) terminated polymers such as those disclosed in U.S. 2,606,173 and in S.N. 398,422 filed September 22, 1964, in the name of E. R. Bertozzi, now U.S. 3,331,816. These polymers have a moelcular weight of about 500 to 12,000 and are liquid, i.e., pourable, at room temperature (about 25° C.). Structurally, they may be represented by the formula $FR'S_x(RS)_mR'F$ wherein $x$ is about 1.0 to 5.0; $m$ is an integer of from 1 to about 100; R and R' are bivalent aliphatic radicals wherein the carbon atoms may be interrupted with oxygen atoms; and F may be an —SSH; —SH; —$NH_2$; OH; a hemiacetal or hemiketal group of the structure

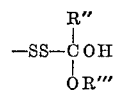

wherein R'' may be H or a lower alkyl group and wherein R''' may be a lower alkyl group; or an

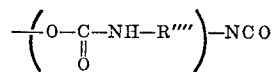

group wherein R'''' may be an alkylene or an arylene group.

The most preferred of such polymers, according to the present invention, are those having a molecular weight of about 500 to 4000, since polymers having these preferred molecular weights allow for the most efficient cure times. The curing agents for the liquid polysulfide polymer which may be used in the sealant compositions of the present invention include all those materials known to the art as liquid polysulfide polymer curing agents such as polyepoxy resins, lead peroxide, calcium peroxide, barium peroxide, tellurium dioxide, manganese dioxide, cumene hydroperoxide, zinc peroxide, p-quinonedioxime, zinc oxide, the various chromate salts such as are disclosed in U.S. 2,964,503, and the curing agents of U.S. 2,606,173 and the copending applications previously cited. About 2.5 to 10 parts by weight of one or more of such curing agents should be used according to the present invention, per 100 parts by weight of liquid polysulfide polymer being used in the sealant composition. These curing agents may be used singularly or in various combinations with one another.

With the novel primer compositions and processes of the present invention, a strong bonding of the cured sealant composition can be obtained by first applying a silane primer to a substrate and then after about 10 minutes applying the sealant composition to the primed substrate and allowing the sealant to cure for about 2 to 24 hours at room temperature (about 25° C).

It is to be understood, according to the present invention, that the concept of "treating" one or more substrates by means of the novel processes and/or compositions disclosed herein includes providing such substrates with protective coatings of the cured compositions of the present invention and/or filling voids between and/or bonding together two or more substrates which substrates may or may not be composed of the same material. The substrates to be thus treated, according to the present invention, include those of a wood nature, those of a siliceous nature such as glass, ceramic, marble, stone and concrete, those of a metallic nature such as aluminum, iron and steel as well as zinc and/or chrome coated iron or steel, and synthetic plastic surfaces.

The curable polysulfide sealant compositions and the primer compositions of the present invention may also contain various types of inert materials commonly employed in polysulfide polymer based sealant and caulking compositions such as fillers, plasticizers, pigments, ultraviolet light stabilizers, cure accelerators, and the like.

The silane compounds of the primer compositions of the present invention are preferably applied to the surface of the substrate(s) being treated in the form of a solution so as to provide thereon at least a monomolecular layer of the silane material and to aid in the ease and economy of application. The solvent medium employed for the primer solutions is an inert organic solvent and should be a fairly volatile material such as ethyl alcohol, toluene, ethylene glycol, monoethyl ether, methanol, n-butanol, isobutanol, chloroform, ethyl acetate, acetone and benzene.

The curable sealant compositions of the present time have a pot life (working life) of about 0.5 to 24 hours and the pot life of these compositions must be taken into consideration when admixing and/or bringing the curing agent in contact with the adhesive and/or liquid polysulfide polymer.

The following examples are merely illustrative of the present invention and are not intended as a limitation upon the scope thereof.

EXAMPLE 1

This example illustrates the effect of the novel primer compositions of the instant invention. The primer compositions are used to prime the surface of various substrates before attempting to adhesively apply thereto various polysulfide polymer based sealant compositions. The primer is applied to the surface of the substrate being treated in the form of a methanol solution by lightly wiping the surface once with a cotton swab saturated with the solution. Various lengths of time are allowed to pass between the step of applying the primer and the step of applying the sealant composition in order to evaluate the effect of the accelerator compound on the silane primer. The effectiveness of the accelerator compound is evaluated at various levels of concentration in these solutions.

The priming solutions used in this example have the following composition, expressed in parts by weight:

PRIMING SOLUTION

| Primer No | 1 | 2 | 3 | 4 | 5 | 6 | 7 | 8 |
|---|---|---|---|---|---|---|---|---|
| Mercapto propyltrimethoxysilane | 5 | 5 | 5 | 5 | 5 | 5 | 5 | 5 |
| 4.6 pH methanol (as solvent) | 95 | 95 | 95 | 95 | 95 | 95 | 95 | 95 |
| Hydroquinone (U. V. Stabilizer) | 1 | 1 | 1 | 1 | 1 | 1 | 1 | 1 |
| $FeCl_3$ | | 1 | | | 2 | | | |
| $BF_3$·etherate | .5 | | 1 | | | 2 | | |
| $AlCl_3$ | | | | 1 | | | 2 | |

The above primers are then each applied on glass as described above at various intervals to give a range of drying times from 10 to 30 min.

A sealant formulation having the following composition expressed in parts by weight, was then applied to the primed glass surfaces.

Sealant formulation:
- Polysulfiide polymer [1] _____ 100
- Carbon black _____ 30
- Methylon 75108 (phenolic adhesive additive) __ 5
- Isostearic acid (retarder-retards the cure) ____ 0.25

[1] The polysulfide polymer had essentially the structure with about 2.0% crosslinking or branching and had a molecular weight of about 4000.

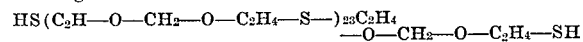

Prior to the application of the sealant formulation to the primed substrate the sealant formulation was mixed with about 15 parts by weight of a lead peroxide/Aroclor 1254 (chlorinated biphenyl-54% chlorine content) curing paste admixture containing about 50% $PbO_2$.

The sealant composition was tested for adhesion to the substrates about one hour after being applied to the primed substrates. The adhesion test consisted of attempting to peel a cured bead of the sealant composition from the substrate. The cured bead comprises a cloth peel strip 1″ x 2″ covered with sealant composition 1/32″ in depth on both sides so as to make a uniform cured bead 1″ x 2″ x 1/16″, when placed on the substrate. The strip is peeled back 180° at one end of the bead and an Instron Tensile Tester produced by Instron Engineering Corp. of Canton, Mass., is attached to the peeled back end and a crosshead speed of 2″/min. is applied to produce a uniform pull on the cured bead. The test was conducted similarly to ASTM #D903. If the bead peeled off the substrate easily without causing a rupture in the structure of the bead, this fact was noted as an "adhesive failure." If the bead ruptured or tore apart rather than pulling off the substrate, this fact was noted as a "cohesive failure." Borderline instances are denoted as "slight cohesive failures." The test was conducted at a room temperature of 84° F. and a relative humidity of 70%. The results were as follows:

DRYING TIME OF PRIMER ON SUBSTRATE PRIOR TO APPLICATION OF SEALANT

| Primer No. | 10 min. | 15 min. | 20 min. | 30 min. |
|---|---|---|---|---|
| 1 | COH[1] | COH | COH | COH |
| 2 | ADH[2] and COH | ADH and COH | ADH and COH | COH |
| 3 | COH | COH | COH | COH |
| 4 | ADH | ADH | ADH | ADH |
| 5 | COH | COH | COH | COH |
| 6 | ADH | ADH | COH | COH |
| 7 | ADH | ADH | COH | COH |
| 8 | ADH | ADH | ADH | COH |

[1] COH=cohesive failure. [2] ADH=adhesive failure.

EXAMPLE 2

Primers #1, #5, and #8 of Example 1 were then tested as per the procedure of Example 1 after various lengths of time after the sealant formulation was applied to glass substrates and under varied conditions. The number of pounds of pull needed to obtain adhesive or cohesive failure was measured. As a control, there was used a sample of the sealant which has been applied to an unprimed glass substrate. The sealant formulation of Example 1 was used in the test. The room temperature was kept at about 74° F. and the relative humidity was at about 79%.

The results were as follows.

TEST #1.—ADHESION PEEL TEST WAS CONDUCTED 2½ HOURS AFTER SEALANT FORMULATION WAS APPLIED TO PRIMED SUBSTRATE

| Primer Drying Time (minutes) | Primer #1 | Primer #5 | Primer #8 | No Primer |
|---|---|---|---|---|
| 10 | 29 COH[1] and sl.[2] ADH[3] | 29 COH | 3 ADH | 1.5 ADH |
| 15 | 26 COH | 26 COH | 3 ADH | |
| 30 | 30.5 COH | 31 COH | 7.5 ADH | |

TEST #2.—ADHESION PEEL TEST WAS CONDUCTED 24 HOURS AFTER SEALANT FORMULATION WAS APPLIED TO PRIMED SUBSTRATE

| | | | | |
|---|---|---|---|---|
| 10 | 60 COH and sl. ADH | 68 COH | 30 ADH and sl. COH | 3 ADH |
| 15 | 58 COH | 58 COH | 14 ADH and sl. COH | |
| 30 | 63 COH | 61 COH | 35 ADH and sl. COH | |

TEST #3.—ADHESION PEEL TEST WAS CONDUCTED 1 WEEK AFTER SEALANT FORMULATION WAS APPLIED

| | | | | |
|---|---|---|---|---|
| 10 | 68 COH | 73 COH | 50 COH and sl. ADH | 6 ADH |
| 15 | 67 COH | 68 COH | 68 COH | |
| 30 | 70 COH | 68 COH | 79 COH | |

TEST #4.—SEALANT FORMULATION WAS APPLIED TO PRIMED SUBSTRATE; 1 WEEK WAS ALLOWED TO PASS; THEN U.V. RADIATION WAS APPLIED TO SEALED SUBSTRATE FOR 100 HOURS; AND FINALLY THE ADHESION PEEL TEST WAS CONDUCTED

| | | | | |
|---|---|---|---|---|
| 10 | 9 ADH | 21 ADH | 10 ADH | 6 ADH |
| 15 | 50 COH sl. and ADH | 22 ADH sl. and COH | 10 ADH | |
| 30 | 9 ADH | 63 COH | 10 ADH | |

[1] COH=Cohesive failure.
[2] sl.=Slight.
[3] ADH=Adhesive failure (numbers represent pounds of pull).

EXAMPLE 3

The procedure of Example 1 for testing adhesion to a glass substrate was followed to illustrate the use of methanol which had not been adjusted to a pH of 4.6 as a solvent carrier for the primer.

The priming solutions and sealant compositions used in this example had the following composition, expressed in parts by weight:

PRIMING SOLUTION

| Primer No. | 1 | 2 | 3 |
|---|---|---|---|
| Mercapto propyl trimethoxy silane | 5 | 5 | 5 |
| Methanol | 95 | 95 | 95 |
| $FeCl_3$ | 2 | | |
| $BF_3$ | | .5 | |

Sealant composition:
- Polysulfide polymer [1] _____ 100
- Carbon black _____ 30
- Methylon 75108 (phenolic adhesive additive) __ 5

[1] The polysulfide polymer had essentially the structure $HS(C_2H_4$-$O$-$CH_2O$-$C_2H_4$-$S$-$S)_{23}$ $C_4H_4$-$O$-$CH_2O$-$C_2H_4$-$SH$ with about 2.0% crosslinking or branching and had a molecular weight of about 4000.

The primers were applied to a glass substrate as in Example 1. After 15 minutes the sealant composition was then applied to the primed substrate.

The adhesion tests were conducted one hour after application of the sealant composition to the primed substrate and under the same conditions and by the same method as in Example 1.

Primer No.:     Primer drying time of 15 minutes
- 1 _____ [1] COH
- 2 _____ COH
- 3 _____ [2] ADH

[1] COH=Cohesive failure.
[2] ADH=Adhesive failure.

EXAMPLE 4

Priming solutions, numbers 1 and 8 of Example 1 were used as a primer for a stainless steel substrate. These priming solutions had been prepared about 9 days prior to use as a primer. The sealant compositions were composed as follows, expressed in parts by weight:

|  | #1 | #2 |
|---|---|---|
| Polysulfide Polymer | 100 | 100 |
| Carbon Black | 30 | 30 |
| Methylon 75108 (phenolic adhesive additive) | 5 | — |

The procedure and tests were followed as in Example 1 with a primer drying time of 10 to 15 minutes before application of the sealant composition. The adhesion tests conducted one hour after application of the sealant composition gave the following results:

|  | Sealant #1 | Sealant #2 |
|---|---|---|
| Prime #1 (BF₃) | COH[1] | COH |
| Prime #8 (control) | ADH[2] | ADH |

[1] COH=Cohesive failure.
[2] ADH=Adhesive failure.

The Friedel-Crafts accelerator compounds of the present invention may be added to the primer compositions at any time prior to coating the primer composition upon the substrate such as at the time of mixing the silane compound with solvent, or if desired, may be added to the primer composition after the primer composition has been applied to the surface of the substrate.

The Friedel-Crafts compounds are used in such amounts as are necessary to achieve the desired results. The amount used is not critical. From about 0.5% to about 5.0% based on the weight of the reactants has been found to be adequate. The exact amount of Friedel-Crafts compound used will depend upon the nature of the organic silane compound, nature of the substrate, the particular weathering conditions to which the substrate will be exposed, and other factors known to one skilled in the art.

We claim:
1. In a process for bonding a curable liquid polysulfide polymer based sealant composition to a substrate by priming said substrate with a primer having at least one organic silane compound, and thereafter applying said curable sealant composition to said primed substrate, and curing said composition thereon, the improvement in combination therewith which comprises the application of at least one Friedel-Crafts compound with the primer to said substrate during the priming step, the amount of Friedel-Crafts compound being sufficient to reduce substantially the curing time of said polymer.
2. A process as in claim 1 wherein said Friedel-Crafts compound consists essentially of $FeCl_3$.
3. A process as in claim 1 wherein Friedel-Crafts compound consists essentially of $BF_3$.
4. A process as in claim 1 wherein said Friedel-Crafts compound consists essentially of $AlCl_3$.
5. A process as in claim 1 wherein said substrate is a siliceous material.
6. A process as in claim 1 wherein said substrate is glass.
7. A process as in claim 1 wherein said organic silane compound is a mercapto alkyl polyalkoxy silane.
8. A process as in claim 1 wherein said substrate is a metallic surface.
9. A process as in claim 1 wherein said substrate is steel.
10. A process as in claim 1 wherein said primer is dissolved in an inert organic solvent.
11. A process as in claim 10 wherein said inert organic solvent is methanol.
12. A process as in claim 11 wherein said polysulfide polymer is a polythiopolymercaptan polymer.
13. A process as in claim 1 wherein said curable polysulfide polymer based sealant composition comprises a polysulfide polymer having a molecular weight of about 500 to 12,000 and a curing agent for said polymer.

References Cited

UNITED STATES PATENTS

| 3,123,495 | 3/1964 | Carpenter et al. | 117—72 |
| 3,297,473 | 1/1967 | Bulbenko | 117—72 |
| 3,312,669 | 4/1967 | Giordano. | |

WILLIAM D. MARTIN, Primary Examiner

R. HUSACK, Assistant Examiner

U.S. Cl. X.R.

117—72, 123, 124, 132